United States Patent
Jenkins et al.

(10) Patent No.: US 6,560,840 B1
(45) Date of Patent: May 13, 2003

(54) METHOD FOR ASSEMBLING A PLURALITY OF JUNCTION BOX COMPONENTS

(75) Inventors: Roderick Rhys Jenkins, Canton, MI (US); David Michael Kazarian, Canton, MI (US); Jerome Adam David Duhr, Westland, MI (US)

(73) Assignee: Yazaki North America, Canton, MI (US)

( * ) Notice: Subject to any disclaimer, the term of this patent is extended or adjusted under 35 U.S.C. 154(b) by 24 days.

(21) Appl. No.: 09/710,465

(22) Filed: Nov. 10, 2000

(51) Int. Cl.$^7$ ............................................... B21D 39/00
(52) U.S. Cl. .................. 29/407.1; 29/467; 29/505; 29/509; 29/525.05; 269/54.5
(58) Field of Search .................. 29/451, 453, 467, 29/505, 509, 513, 521, 522.1, 525.05, 243.5, 830, 407.09, 407.1, 464; 269/53, 54.4, 54.5; 228/49.1, 212

(56) References Cited

U.S. PATENT DOCUMENTS

| 2,347,411 A | * | 4/1944 | Hefler et al. .............. 29/407.09 |
| 2,957,237 A | * | 10/1960 | Regle et al. .................. 29/505 |
| 3,061,526 A | * | 10/1962 | Skoknick ................. 29/407.09 |
| 3,197,844 A | * | 8/1965 | Bassett, Jr. ................. 29/407.1 |
| 3,754,310 A | * | 8/1973 | Shea .............................. 29/512 |
| 4,208,080 A | * | 6/1980 | Teogno .......................... 29/830 |
| 4,506,442 A | * | 3/1985 | Alzmann et al. .............. 29/830 |
| 4,781,600 A | * | 11/1988 | Sugiyama et al. ............. 29/830 |
| 5,047,896 A | * | 9/1991 | Zust .............................. 29/830 |
| 5,368,802 A | * | 11/1994 | Wanha ......................... 29/509 |
| 5,434,749 A | | 7/1995 | Nakayama |
| 6,023,409 A | | 2/2000 | Takahashi |

FOREIGN PATENT DOCUMENTS

| JP | 06097598 | 11/1995 |
| JP | 08272501 | 5/1998 |
| JP | 10153083 | 12/1999 |

* cited by examiner

*Primary Examiner*—Gregory Vidovich
*Assistant Examiner*—Jermie E. Cozart
(74) *Attorney, Agent, or Firm*—Young & Basile P.C.

(57) ABSTRACT

A method and apparatus for aligning and heat staking a plurality of stackable junction box components having pilot holes normally used only for registration and alignment purposes. A heat stakable element is inserted through the pilot holes and used to secure the stacked components through the pilot holes. This eliminates the need for heat stake and stake hole structure built into the various junction box layers, thereby freeing up valuable junction box layout space for additional bus bar runs and electrical component receptacles. In a preferred form the heat stakable element is formed in the shape of a pilot pin to engage the pilot holes and simultaneously register and heat stake them together.

3 Claims, 6 Drawing Sheets

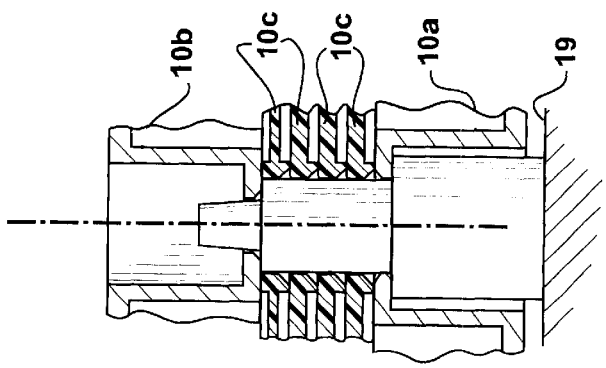
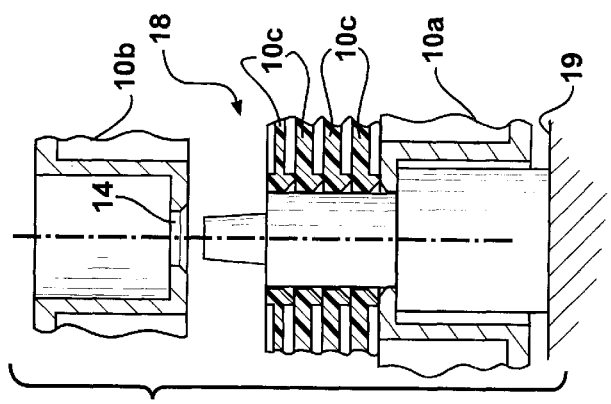
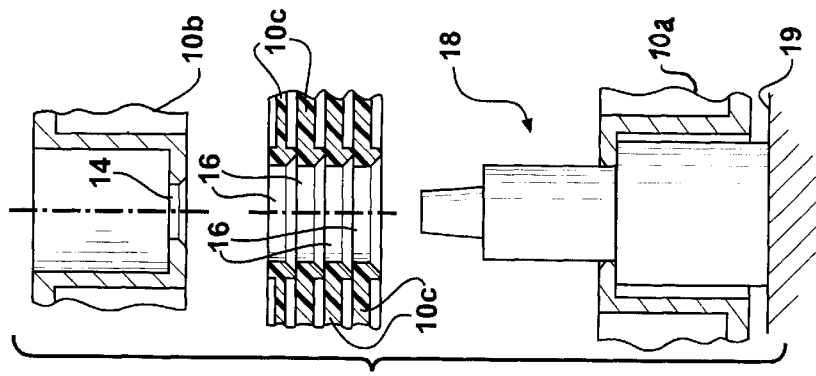
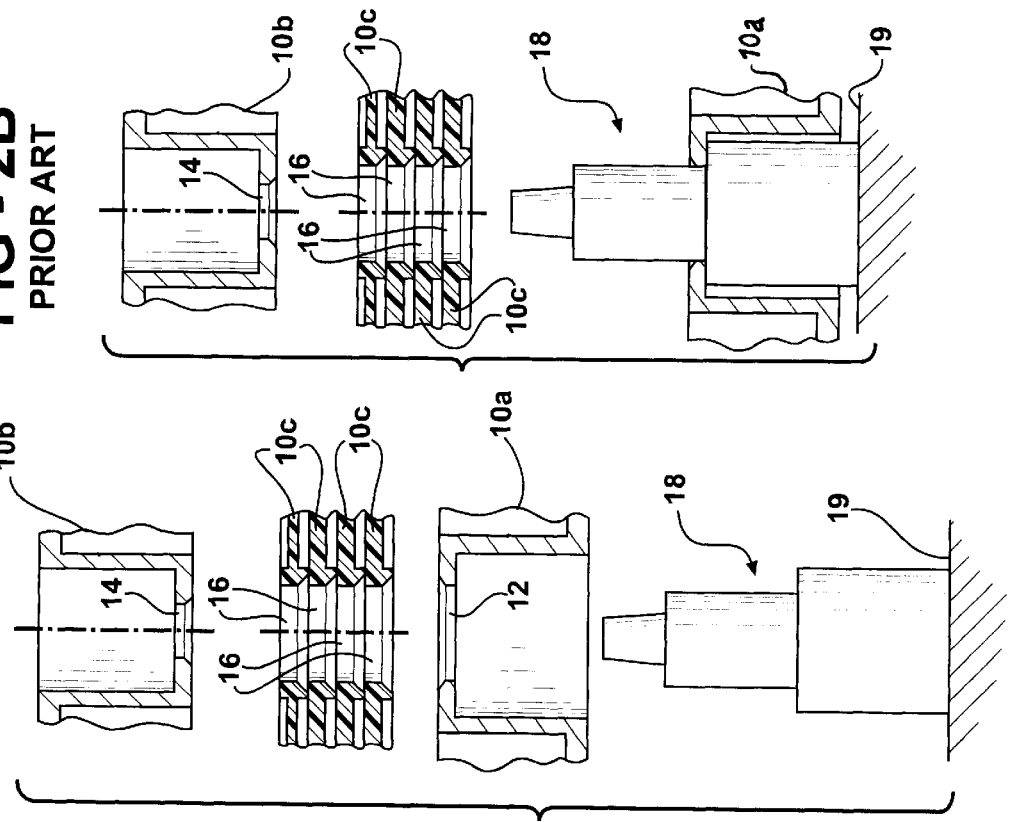

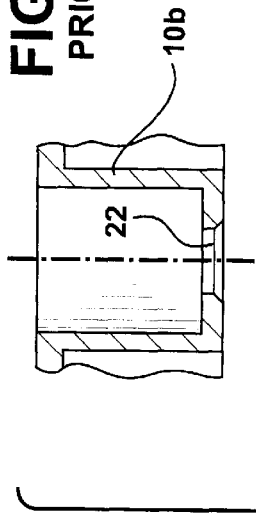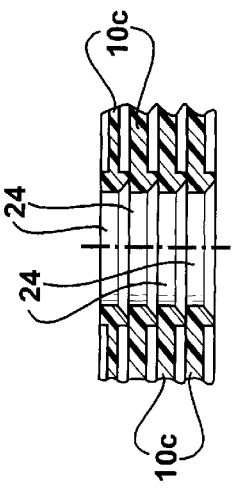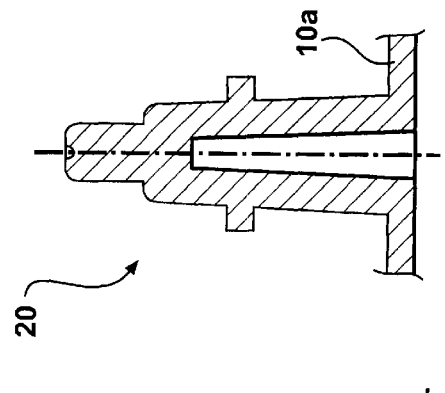
FIG - 2E PRIOR ART
FIG - 2F PRIOR ART
FIG - 2G PRIOR ART

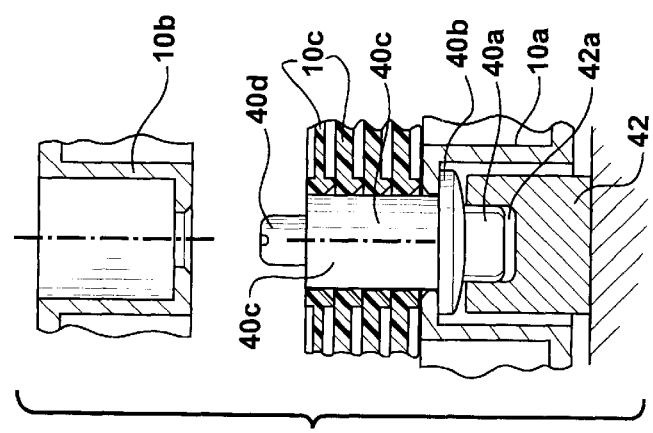
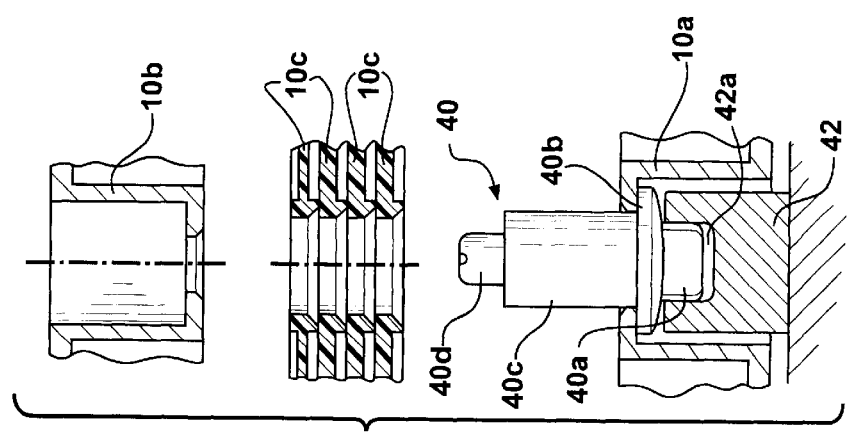
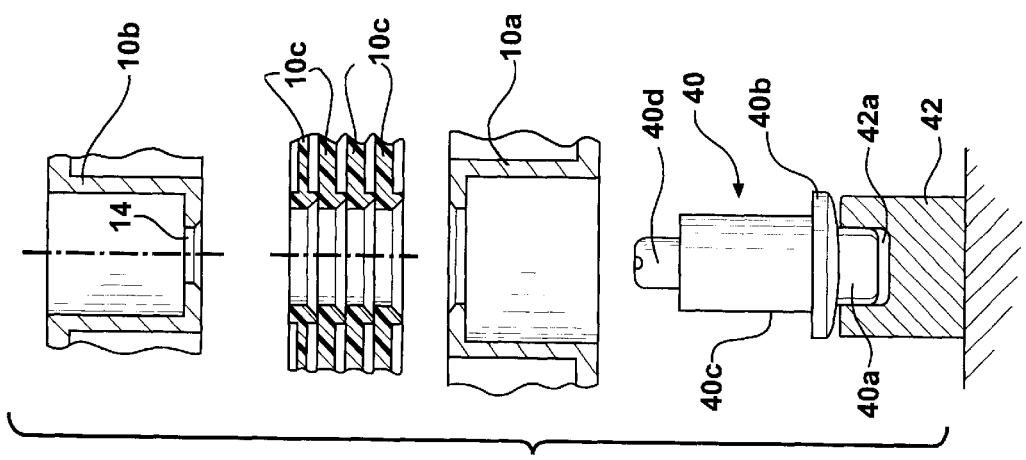

METHOD FOR ASSEMBLING A PLURALITY OF JUNCTION BOX COMPONENTS

FIELD OF THE INVENTION

The present invention is in the field of methods and devices for assembling multi-layered electrical junction boxes, especially those used in automotive applications.

BACKGROUND OF THE INVENTION

Automotive junction boxes, power distribution centers, and the like typically comprise stacked array of plastic insulating plates and covers, which are sandwiched and at least semi-permanently secured together prior to being installed in a vehicle. Referring to FIG. 1, an exemplary representation of a prior art junction box 10 includes a plastic bottom cover 10a, a plastic top cover 10b, and a plurality of insulation plates 10c sandwiched therebetween in stacked relationship. Insulation plates 10c are provided with various conductive pathways typically formed with metal bus bars laid out in circuitous arrangements designed to inter-connect and re-route multi-branch wiring from vehicle electrical systems using various electrical components (fuses, relays, etc.) plugged into the junction box via suitable receptacles formed in top cover 10b.

As vehicles incorporate ever greater numbers of electrical components and systems, junction boxes are increasingly designed to accommodate ever greater numbers of electrical components. At the same time, junction boxes are expected to remain the same size, or to be made smaller.

A typical method for assembling junction boxes such as that shown in FIG. 1 is illustrated in FIGS. 2A–2G. The junction box covers 10a, 10b and insulation plates 10c are each provided with aligned, coaxially mating pilot holes 12, 14, 16 sized to receive an alignment pin or pilot 18 at an assembly station 19. As best shown in FIGS. 2A–2D, bottom cover 10a, insulation plates 10c, and top cover 10b are sequentially lowered onto stationary pilots 18, the pilots engaging and passing through the respective holes, 12, 14, 16 to register and maintain the stacked plates and covers in proper alignment until the stacked components can be at least semi-permanently secured together. For this purpose, the assembly station will typically have at least two pilot pins 18 to prevent rotation of the stacked, registered junction box components, although it may be possible in certain cases to use a single, asymmetrical pilot engaging asymmetrical pilot holes in the stacked components to prevent rotation.

Referring to FIG. 1 again, lower cover 10a is provided with weld boss, heat stake or similar structure generally in the form of upright pin members 20 designed to pass through mating stake holes 22 and 24 in the top cover and insulation plates as the covers and plates are being aligned and registered on pilot pin 18 at the assembly station. As shown in FIGS. 2E–2G, the insulation plates and top cover are lowered down over heat stake pins 20 and the upper ends of the heat stake pins protruding through holes 22 in the top cover are then flattened or otherwise deformed in known manner using a technique such as heat staking, sonic welding, and others known to those skilled in the art. This locks the assembly of stacked junction box components together and the junction box is then removed from pilot pins 18 at the assembly station for installation in a vehicle.

A significant drawback of the foregoing method for aligning and staking junction box components lies in the fact that valuable junction box layout and component receptacle space is taken up by the pilot holes and stake holes. The placement of the pilot and stake holes complicates the routing of bus bars on the insulation plates and must be factored into the placement of plug-in components on the top cover, an increasingly complicated procedure.

SUMMARY OF THE INVENTION

The present invention eliminates the need for separate pilot and stake hole structure by replacing the usual pilot pin at the assembly station with a plastic heat stake pin or weld boss designed to fit through the pilot holes formed in the junction box components and to be melted or otherwise deformed in the manner of a conventional heat stake. In a preferred form, this combination pilot pin/heat stake is configured as the usual pilot pin, is held at an assembly station as if it were a pilot pin, and the pilot holes on the junction box components are stacked in place over the pilot pin/heat stake for proper alignment and registration. Immediately thereafter, and without removing the registered components from the station, the upper end of the pilot pin/heat stake is melted, punched, or otherwise deformed in the manner of a typical heat stake to lock the stacked components together.

In a most preferred form of the invention, the pilot pin/heat stake (hereafter "pilot stake") has a lower plug portion adapted to be securely but removably seated in a holder or jig at the assembly station. The jig securely positions the pilot stake in an upright position ready to receive the junction box components in stacked relationship thereover. The jig also provides a secure base or anvil for the bottom of the pilot stake while the upper end of the pilot stake is being deformed to lock the stacked junction box components togther. Once the deformation has taken place, the pilot stake (which is now locked to the junction box) can be pulled free from the jig.

In yet a further preferred form of the invention, the configuration of the jig for the pilot stake combines with the configuration of the pilot stake when the pilot stake is seated therein to replicate the configuration of the original pilot pin for which the pilot holes in the stacked junction box components were designed. The assembly can thus be considered a composite pilot pin with a breakaway heat stake feature.

These and other features and advantages of the invention will become apparent upon a further reading of the specification in light of the accompanying drawings.

DESCRIPTION OF THE DRAWINGS

FIGS. 2A–2D illustrate the stacking of the junction box components of FIG. 1 over a pilot pin at an assembly station according to the prior art.

FIGS. 2E–2G illustrate the simultaneous stacking of intermediate and top layers of the junction box components over heat stake elements on the junction box lower cover during the pilot pin registration in FIGS. 2A–2D, according to the prior art.

FIGS. 4A–4F illustrate a second, preferred embodiment of the invention in which the pilot pin structure of FIGS.

Figure 3C:
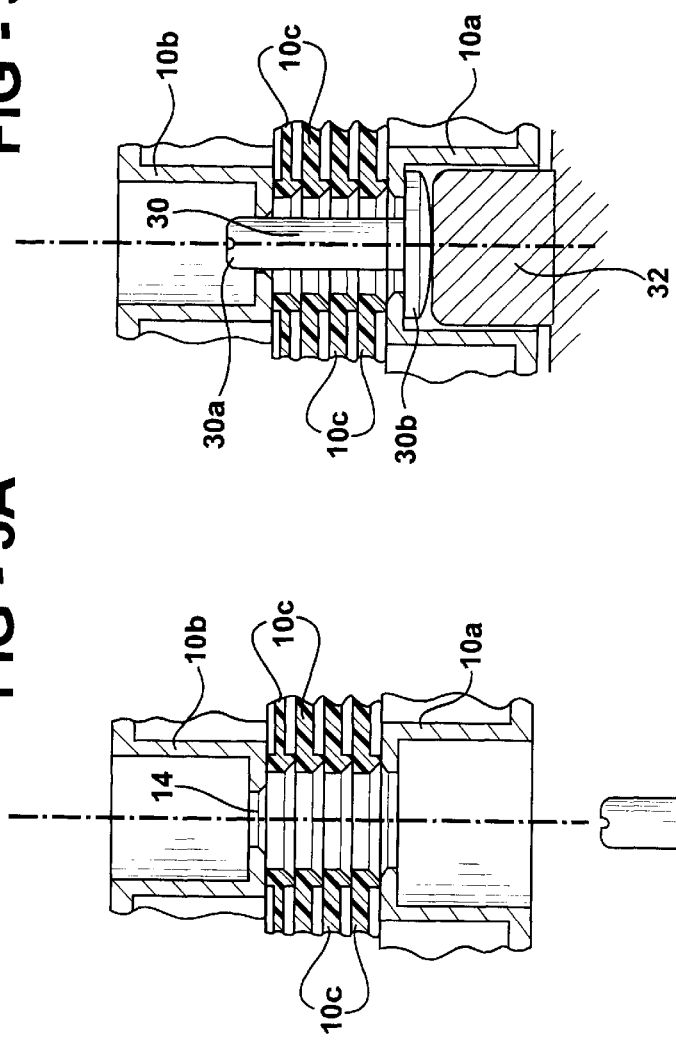
FIGS. 3A–3C illustrate a first embodiment of the present invention, a separate insertable heat stake, being placed through the pilot pin holes of FIGS. 2A–2D after the stacked and registered junction box components have been removed from the pilot pins.
Figure 3B:
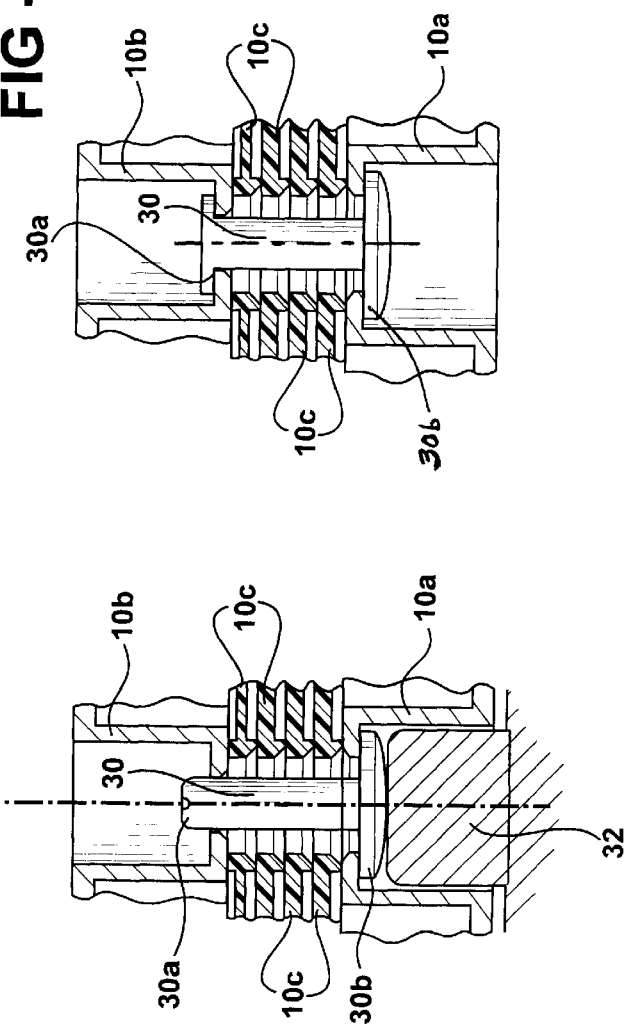
Figure 3A:
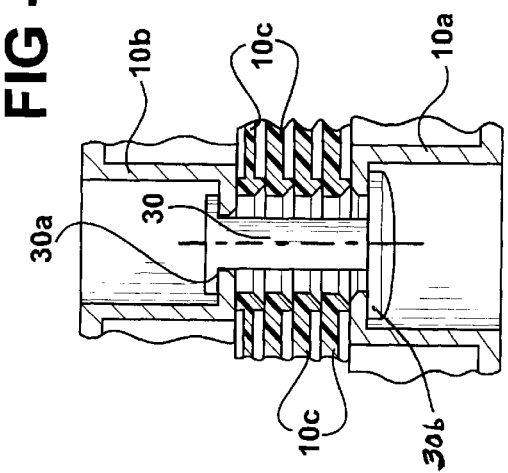

2A–2D and the separate heat stake assembly of FIGS. 3A–3C have been replaced by a composite pilot stake structure which serves to both register and secure the stacked junction box components at a single station.

Figure 5:
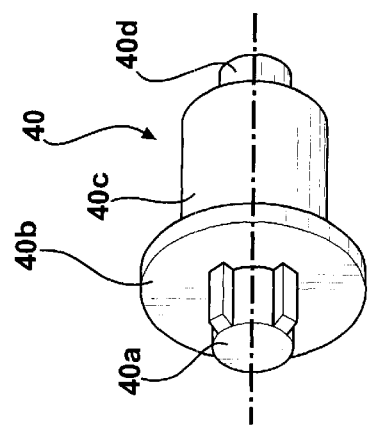

FIG. 5 is a perspective end view of the pilot stake member from FIGS. 4A–4F.

DETAILED DESCRIPTION OF THE ILLUSTRATED EMBODIMENT

Referring first to FIGS. 3A–3C, a first embodiment of the invention is illustrated in connection with the pilot hole structure of FIGS. 2A–2D. In this embodiment the heat stake structure 20 illustrated in FIGS. 1 and 2E–2G is eliminated from the lower cover along with stake holes 22, 24 in the top cover and insulation plates. Once the junction box components have been stacked and registered on the pilot pins 18 as shown in FIGS. 2A–2D, the stacked junction box assembly is clamped together, removed from the pilot pins, and transferred to a second work station as shown in FIGS. 3A–3C, where the stacked components are secured to one another with a plastic heat stake or weld boss such as that shown in reference number 30. Heat stake 30 is passed upwardly through the same pilot holes 12, 14, 16 used for pilot pin registration in FIGS. 2A–2D. The upper end 30a of heat stake 30 is preferably configured to engage upper stake hole 14 in a friction- or snap-fit to temporarily hold the stacked junction box components in proper alignment. Subsequently, as shown in FIG. 3B, the lower end or cap 30b of the heat stake 30 is held in place with a pallet or jig or similar holder such as 32 while the upper end 30a is melted or deformed around the top cover stake hole using a known process such as heat staking. The resultant assembly shown in FIG. 3C is permanently locked together by heat stake 30.

Figure 1:
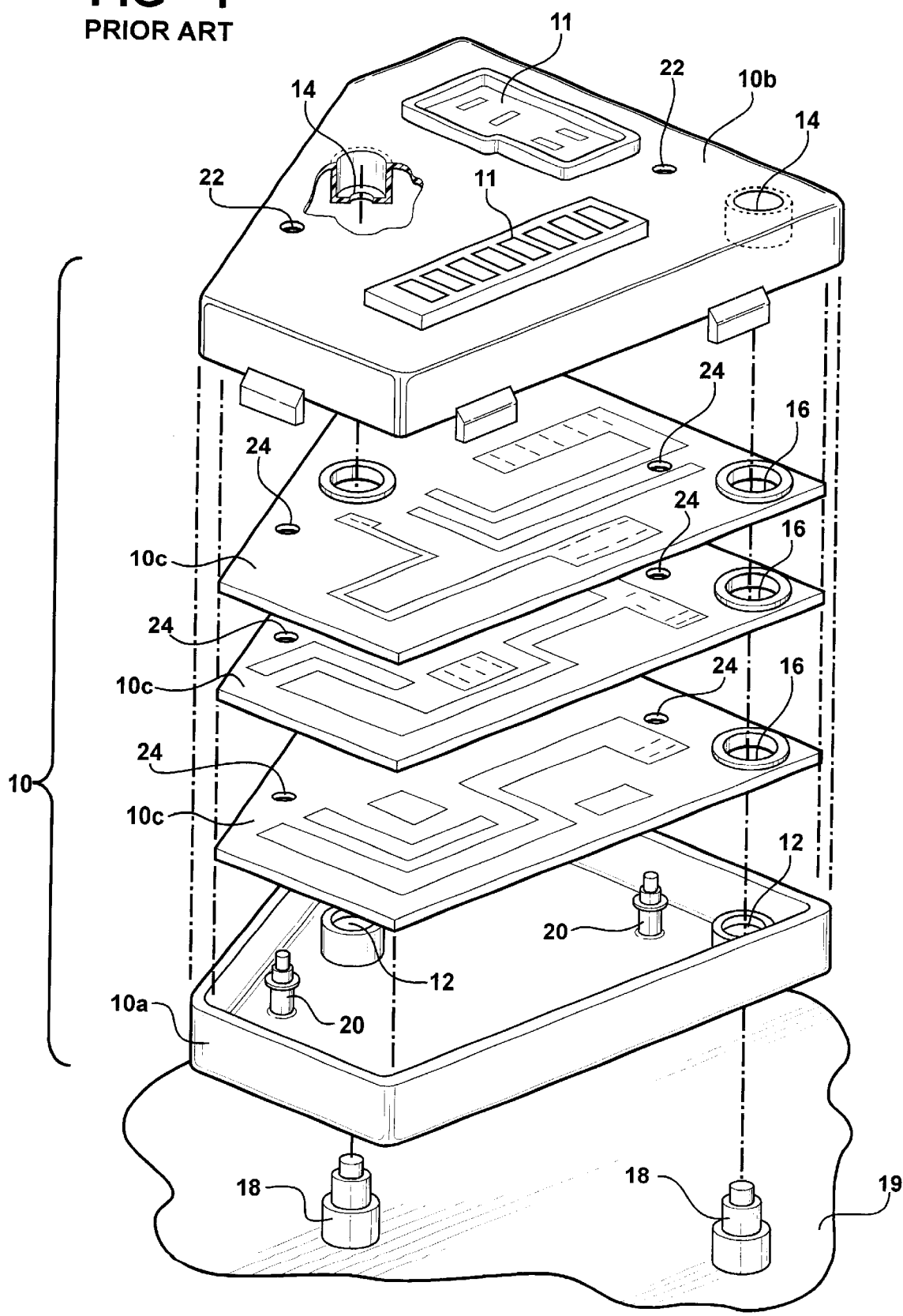
FIG. 1 is a perspective, exploded view of the disassembled components of a typical prior art junction box assembly.

The use of a separately formed, insertable heat stake designed to engage the original pilot hole structure in the stacked junction box components eliminates the need for separate heat stake holes and internal heat structure such as 20, 22, 24 in FIG. 1. By simply eliminating this structure from the junction box assembly of FIG. 1, valuable junction box layout and component receptacle space is freed up for junction box design.

Referring next to FIGS. 4A–4F, a second, preferred embodiment of the invention is illustrated which eliminates the need for separate pilot pin registration and staking stations. A pilot stake combining both pilot pin and heat stake features is illustrated at reference numeral 40, secured in an upright position at a pilot pin station on a complementary jig 42, with a lowermost plug portion 40a removably secured in a mating receptacle 42a in jig 42. In the illustrated embodiment, pilot stake 40 is made from a heat deformable plastic of known type, while base 42 is made from metal such as aluminum or steel. It will be understood by those skilled in the art that the type of plastic employed in pilot stake 40 can vary, and that base 42 need not be necessarily made from metal, although metal is preferred. Base 42 is preferably integrated with assembly station 19 in the manner of pilot pins 18. Generally, the number of bases 42 and pilot stakes 40 will correspond to the number of pilot pins 18 previously used for a particular junction box assembly.

Still referring to FIG. 4A and additionally to FIG. 5, illustrated pilot stake 40 includes a cap portion 40b having a diameter greater than plug portion 40a; a stem 40c having a diameter less than cap 40b, and having a length sufficient to extend through the layers of stacked insulation plates 10c; and a tip 40d having a diameter smaller than stem 40c designed to fit through uppermost pilot hole 14 in the top cover of the junction box and having a length designed to extend a deformable portion above pilot hole 14 to be deformed to a diameter larger than the pilot hole in known manner. Tip 40d is preferably shaped to engage uppermost stake holes 22 injunction box cover 10b in a friction- or snap-fit.

It will be understood by those skilled in the art that while pilot stake 40 is illustrated as being inserted through the bottom cover and being heat staked to the top cover, it is possible to reverse the orientation of the junction box relative to the pilot stake or the orientation of the pilot stake insertion relative to the junction box.

It will also be understood by those skilled in the art that while pilot stake 40 and the pilot holes are illustrated as being cylindrical and circular, respectively, it is possible for pilot stake 40 (or any portion thereof) to have various symmetrical or asymmetrical geometries to accommodate differently-shaped pilot holes.

Referring to FIG. 4B, bottom cover 10a has been located on pilot stake 40, with pilot hole 12 fitting over stem 40c to rest on cap 40b. The cylindrical well surrounding pilot hole 12 fits over cylindrical base 42. At this point it should be noted that the pilot stake and base configuration illustrated herein is a preferred form which essentially duplicates the multi-shouldered, stacked geometry of the original metal pilot pin 18 as shown in FIGS. 2A–2D. However, pilot stake 40 represents a removable, stakeable portion which is separated from its metal base 42 after the assembly process. The combination of pilot stake 40 and base 42 can accordingly be considered a composite, separable pilot pin and heat stake structure in which the upper plastic portion is repeatedly removed and replaced as new junction box assemblies are stacked, staked and removed.

Referring to FIG. 4C, insulation plates 10c are next lowered over the stem portion 40c of the pilot stake, in the illustrated embodiment the length of stem 40c being chosen to approximately equal the height of the stacked insulation plates 10c and the wall thickness of bottom cover 10a, such that the upper end of stem 40c is essentially flush with the upper surface of the topmost insulation plate 10c as illustrated.

Figure 4F:
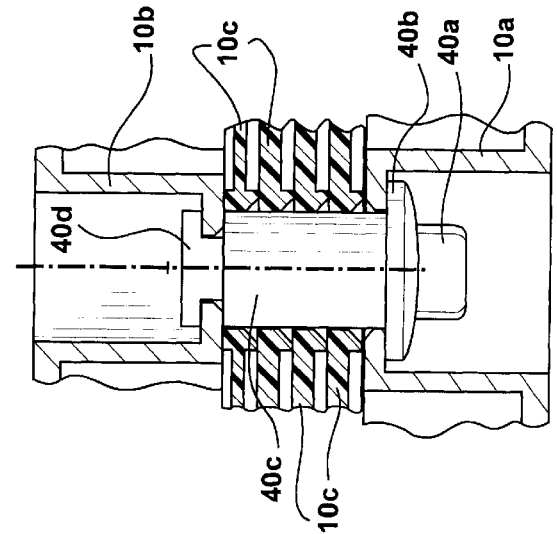
Figure 4E:
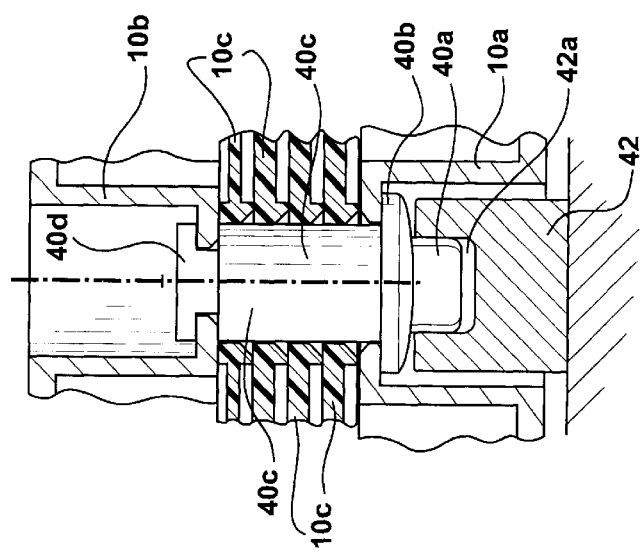
Figure 4D:
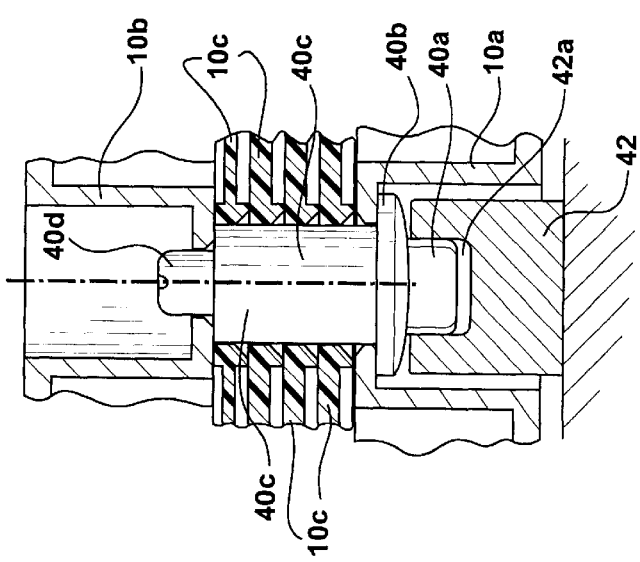

Referring to FIG. 4D, top cover 10b is finally lowered in place over pilot stake tip 40d, resting on the upper end of stem 40c as shown. At this point, a portion of tip 40d sufficient to be deformed in known manner to spread over the surface of the top cover around pilot hole 14 protrudes from the pilot hole. FIG. 4E illustrates the pilot stake shortly after a heat staking device has deformed the protruding portion of tip 40d against the top cover to securely lock the stacked junction box components together. During this heat stake procedure, base 42 acts as an anvil which counteracts the force of the heat staking. As will be apparent to those skilled in the art, there may also be other mechanisms pressing down on the top cover to maintain the top cover, the stacked insulation plates, and the bottom cover in a tight, sandwiched fit until the heat staking procedure is finished.

Referring finally to FIG. 4F, the junction box components secured with pilot stake 40 are removed from base 42 at the assembly station as an integrated junction box assembly by simply lifting the junction box and disengaging plug portion 40a from base 42. Preferably, at most the fit between plug 40a and base 42 is a friction fit which is easily overcome when lifting the junction box assembly from the assembly station.

The invention accordingly eliminates the need for separate assembly and staking stations, and further eliminates the need for separate stake holes formed in the various junction box layers. This not only reduces manufacturing time, but frees up valuable layout space in the stacked junction box layers for additional circuit paths and electrical components. It is accordingly desirable to use the invention in conjunction with stackable junction box layers which have been designed to have only pilot holes. It will be understood, however, that the invention is equally useful with older style stackable junction box components having both pilot holes and stake holes; the stake holes are not used, and the manufacturing process is simplified.

The foregoing embodiment of the invention is provided for illustration and explanation, and is not intended to limit the invention beyond the scope of the appended claims. Many minor modifications and variations of the assembly operation, the shape of the pilot stake, the form of supporting base or jig structure, and other aspects of the illustrated embodiment will be apparent to those skilled in the art now that we have disclosed our invention. Accordingly,

We claim:

1. A method for assembling and heat staking a plurality of stackable junction box components to one another, the junction box components being provided with alignable pilot holes for admitting pilot pins of a first configuration therethrough to register the stackable junction box components, the method comprising the following steps:

stacking and registering the junction box components on a pilot pin structure which extends through the aligned pilot holes;

removing the stacked, registered junction box components from the pilot pin structure; and then inserting a separately formed heat staking element through the aligned pilot holes in the stackable junction box components and heat staking the heat stakable element in place in the pilot holes to permanently secure the stacked and registered junction box components to one another, wherein the need for separate stakes and stake holes in the junction box components is eliminated.

2. A method for assembling and heat staking a plurality of stackable junction box components to one another, the junction box components being provided with alignable pilot holes for admitting pilot pins of a first configuration therethrough to register the stackable junction box components, the method comprising the following steps:

providing a heat stakable element in the form of at least a portion of a pilot pin, the heat stakable element being removably secured directly in a mating receptacle on a supporting jig member which, together with the heat stakable element secured therein, defines a complete pilot member;

stacking the junction box components on the heat stakable element for registration and alignment of the pilot holes by having the pilot holes receive the heat stakable element, and, while the junction box components remain stacked on the heat stakable element, heat staking the heat stakable element in place in the pilot holes to secure the junction box components to one another, wherein separate assembly and stake stations, and separate stake holes in the junction box components for the heat stakable element, are not needed; and removing the heat stakable element from the receptacle of the supporting jig member as part of an assembled junction box after the heat staking step.

3. A method of assembling and heat staking a plurality of stackable junction box components to one another in an aligned and vertically stacked arrangement comprising the steps of:

providing a first of said components with a bottom opening recess of a first diameter and a pilot pin hole of a second smaller diameter opening to said recess;

providing each of the remaining components with pilot holes of essentially said second diameter which can be aligned with one another and with the pilot pin hole of said first component;

providing an alignment fixture with a pedestal sized to fit in said recess;

placing the components in a stacked array with said pilot holes in alignment such that the pedestal extends into the recess of said first component;

placing a heat stakable element having a head and a shaft in said aligned components such that the head is in the recess on top of the pedestal and the shaft projects through the aligned pilot pin holes;

staking the projecting end of the shaft; and removing the staked and aligned arrangement from the pedestal.

* * * * *